US010542677B1

(12) United States Patent
Kringstad

(10) Patent No.: US 10,542,677 B1
(45) Date of Patent: Jan. 28, 2020

(54) CROP CART CLEANING AND UNLOADING SYSTEM

(71) Applicant: Safe-T-Pull, Inc., Park River, ND (US)

(72) Inventor: Jacob L. Kringstad, Park River, ND (US)

(73) Assignee: Safe-T-Pull, Inc., Park River, ND (US)

( * ) Notice: Subject to any disclaimer, the term of this patent is extended or adjusted under 35 U.S.C. 154(b) by 0 days.

(21) Appl. No.: 16/425,518

(22) Filed: May 29, 2019

(51) Int. Cl.
| A01D 90/12 | (2006.01) |
| A01D 90/10 | (2006.01) |
| B65G 67/24 | (2006.01) |
| A01D 33/08 | (2006.01) |
| B65G 45/10 | (2006.01) |

(52) U.S. Cl.
CPC ............. *A01D 90/12* (2013.01); *A01D 33/08* (2013.01); *A01D 90/10* (2013.01); *B65G 45/10* (2013.01); *B65G 67/24* (2013.01); *B65G 2201/0211* (2013.01); *B65G 2814/02* (2013.01); *B65G 2814/0326* (2013.01)

(58) Field of Classification Search
CPC ...... A01D 33/08; A01D 90/10; A01D 90/105; A01D 90/12; B65G 45/10; B65G 47/18; B65G 67/24; B65G 2201/0211; B65G 2814/02; B65G 2814/0326
See application file for complete search history.

(56) References Cited

U.S. PATENT DOCUMENTS

| 2,419,824 A | 4/1947 | Davis |
| 2,655,274 A | 10/1953 | Lowe |
| 2,976,550 A * | 3/1961 | Silver .................... A01D 33/08 15/3.11 |
| 3,037,780 A | 6/1962 | Skromme |
| 3,047,173 A | 7/1962 | Raney |
| 3,189,202 A | 6/1965 | Hansen |

(Continued)

FOREIGN PATENT DOCUMENTS

| DE | 102008053325 | 4/2010 |
| DE | 102009035038 | 4/2010 |

(Continued)

OTHER PUBLICATIONS http://www.spudnik.us/products/4835.php; The New Crop Cart Webpage from Spudnik; May 12, 2015.

(Continued)

*Primary Examiner* — Gene O Crawford
*Assistant Examiner* — Keith R Campbell
(74) *Attorney, Agent, or Firm* — Neustel Law Offices

(57) ABSTRACT

A crop cart cleaning and unloading system for cleaning debris such as dirt and rocks from a crop as the crop is being transferred between a hopper of a crop cart and a transport vehicle. The crop cart cleaning and unloading system generally includes a hopper for receiving a crop such as potatoes. The hopper transfers the crop onto a cleaning bed on which the crop is cleaned of debris, with the debris falling underneath the cleaning bed. The crop is conveyed across the cleaning bed as it is cleaned, with the cleaned crop being transferred from the cleaning bed onto an unloading conveyor. The unloading conveyor then transfers the cleaned crop to another location to be discharged, such as directly into a transport vehicle for further transport and processing.

17 Claims, 14 Drawing Sheets

(56) References Cited

U.S. PATENT DOCUMENTS

| | | | |
|---|---|---|---|
| 3,217,346 A * | 11/1965 | Silver | B07B 1/15 |
| | | | 15/3.11 |
| 3,451,084 A * | 6/1969 | Silver | A01D 17/06 |
| | | | 15/3.11 |
| 3,629,890 A | 12/1971 | Harris | |
| 4,471,876 A * | 9/1984 | Stevenson, Jr. | A01D 17/06 |
| | | | 15/3.11 |
| 4,494,904 A | 1/1985 | Hill | |
| 5,013,207 A | 5/1991 | Baker | |
| 5,364,221 A | 11/1994 | Theurer | |
| 5,697,451 A * | 12/1997 | Nicholson | A01D 17/06 |
| | | | 171/133 |
| 7,540,700 B2 | 6/2009 | Hook | |
| 2016/0129823 A1 | 5/2016 | Millsaps, II | |
| 2016/0286727 A1 | 10/2016 | Telkamp | |
| 2016/0360704 A1 * | 12/2016 | Kringstad | A01D 90/10 |

FOREIGN PATENT DOCUMENTS

| | | |
|---|---|---|
| DE | 202013102388 | 8/2013 |
| WO | WO 2016/087860 | 6/2016 |

OTHER PUBLICATIONS http://www.hsrowcrop.com/archived/pdf/sugarbee2-lowres.pdf: Sugarbeet Cart Brochure from H&S Manufacturing; May 6, 2015.

http://hydraulicdumpcart.com/; High Dump Cart Webpage from HighDumpCart.com; May 12, 2015.

http://www.oxbocorp.com/Products/DumpCarts.aspx; Dump Carts Webpage from Oxbo International Corporation; May 12, 2015.

https://www.scottsuk.com/evolution-separator/; Scott's Precision Manufacturing Evolution Separator Webpage; May 25, 2019.

https://www.youtube.com/watch?time_continue=3&v=jEQ1HEZXIJg;YouTube Page of Scotts Evolution Separator Removing Haulm from Potatoes; Jan. 8, 2016.

https://www.youtube.com/watch?v=3oXkhrwR58o; YouTube Page of Scotts Evolution Separator Fitted into Grimme GZ Harvester; Jan. 7, 2016.

https://www.youtube.com/watch?v=rUfjJEvasfs; YouTube Page of Scotts Evolution Separator on Small Salada Baby Potatoes; Jan. 6, 2016.

https://www.youtube.com/watch?v=LA_dAyNdsxc; YouTube Page of Scotts Evolution Separator in Slow Motion; Dec. 2, 2015.

https://www.youtube.com/watch?v=hvZQbZw3GPA; YouTube Page of Destoner Washer Evolution on Carrots at MH Poskitts; Apr. 14, 2015.

https://www.youtube.com/watch?v=Eh9YpgMUsAk; YouTube Page of Scotts Evolution Separator Pre-Cleaning Apples; Dec. 2, 2016.

* cited by examiner

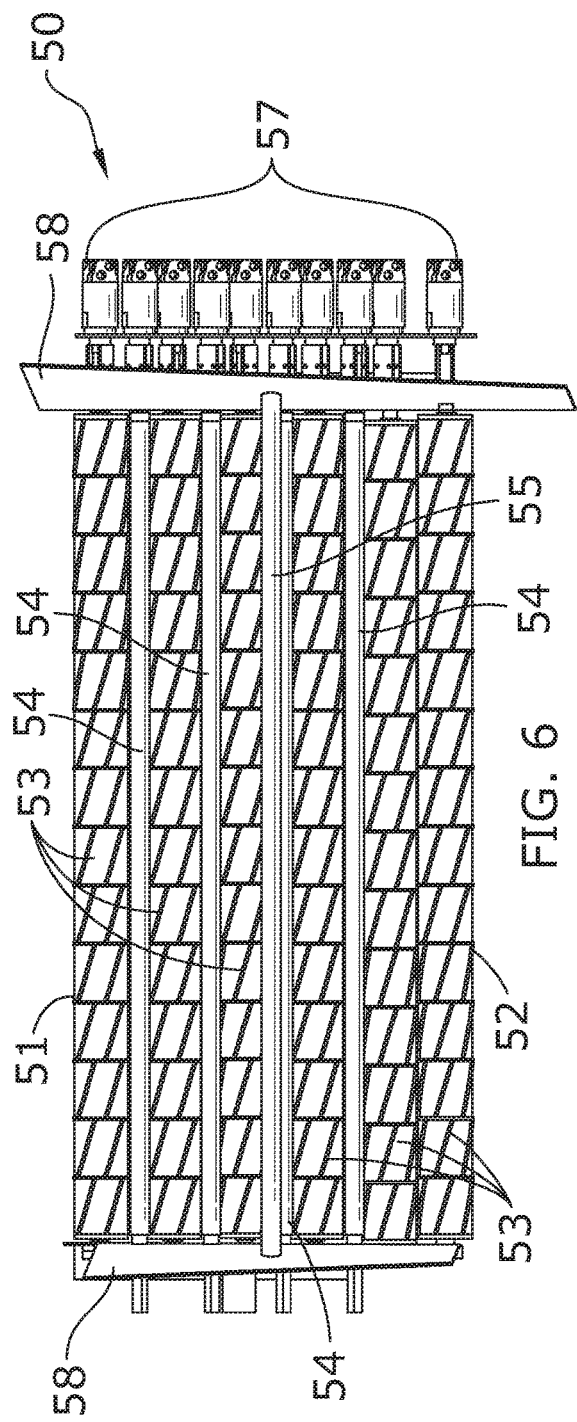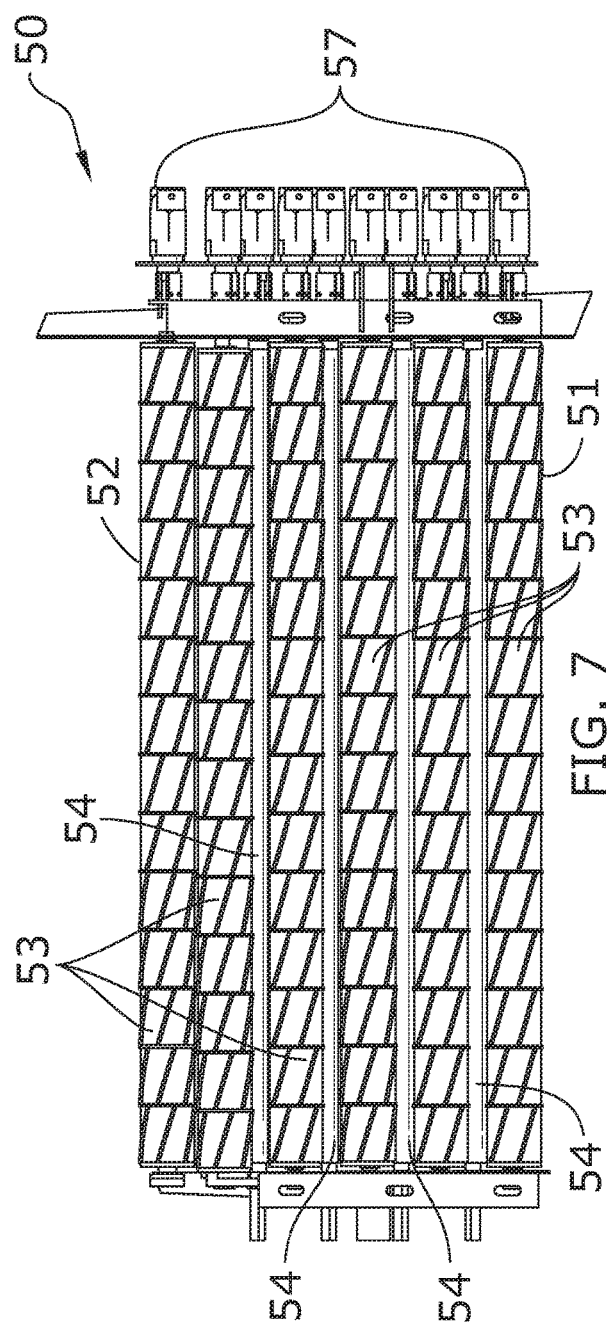

CROP CART CLEANING AND UNLOADING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a crop cart cleaning and unloading system for cleaning debris such as dirt and rocks from a crop as the crop is being transferred between a hopper of a crop cart and a transport vehicle.

Related Art

Any discussion of the related art throughout the specification should in no way be considered as an admission that such related art is widely known or forms part of common general knowledge in the field.

Crop carts are used to receive a crop from a harvester directly in the field during harvest. Crop carts can also be used to transport seed to a planter. Crop carts are typically used to receive, transport and unload various types of field crops such as, but not limited to, sugar beets, carrots, potatoes, onions, tomatoes, cucumbers, corn silage and the like.

Conventional crop carts are comprised of a trailer that is pulled by a tractor through the field next to the harvester. Conventional crop carts include an open topped hopper that receives various volumes of harvested crop from the harvester in real-time. When the hopper of the crop shuttle is full, the crop cart is transported to a location in the field to unload to a truck or other transport device using an unloading conveyor at the front of the hopper. The hopper includes a floor conveyor that moves the crop forwardly towards the unloading conveyor where the unloading conveyor is angled upwardly to lift the crop upwardly from the crop shuttle into the transport vehicle.

When using such conventional systems, the crop is generally transferred from harvester to crop cart to unloading conveyor to transport vehicle without any cleaning of debris from the crop except for that which is incidental to the crop's conveyance through the system. While it is certainly practical to clean the crop after unloading from the transport vehicle, the volume of crop capable of being stored by a particular transport vehicle is limited by the size of the transport vehicle. Typical crop that has just been harvested has a large amount of debris that can take up valuable space in the transport vehicle. The larger the amount of debris present on the crop when it is transferred into the transport vehicle, the more trips by the transport vehicle (or the more transport vehicles) will be needed. It would thus be far more efficient to clean the crop of debris prior to the crop reaching the transport vehicle.

SUMMARY

An example embodiment is directed to a crop cart cleaning and unloading system. The crop cart cleaning and unloading system includes a hopper for receiving a crop such as potatoes. The hopper transfers the crop onto a cleaning bed on which the crop is cleaned of debris, with the debris falling underneath the cleaning bed. The crop is conveyed across the cleaning bed as it is cleaned, with the cleaned crop being transferred from the cleaning bed onto an unloading conveyor. The unloading conveyor then transfers the cleaned crop to another location to be discharged, such as directly into a transport vehicle for further transport and processing.

There has thus been outlined, rather broadly, some of the embodiments of the crop cart cleaning and unloading system in order that the detailed description thereof may be better understood, and in order that the present contribution to the art may be better appreciated. There are additional embodiments of the crop cart cleaning and unloading system that will be described hereinafter and that will form the subject matter of the claims appended hereto. In this respect, before explaining at least one embodiment of the crop cart cleaning and unloading system in detail, it is to be understood that the crop cart cleaning and unloading system is not limited in its application to the details of construction or to the arrangements of the components set forth in the following description or illustrated in the drawings. The crop cart cleaning and unloading system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 6 is a top view of a cleaning bed of a crop cart cleaning and unloading system in accordance with an example embodiment.

FIG. 7 is a bottom view of a cleaning bed of a crop cart cleaning and unloading system in accordance with an example embodiment.

DETAILED DESCRIPTION

A. Overview

Figure 1:
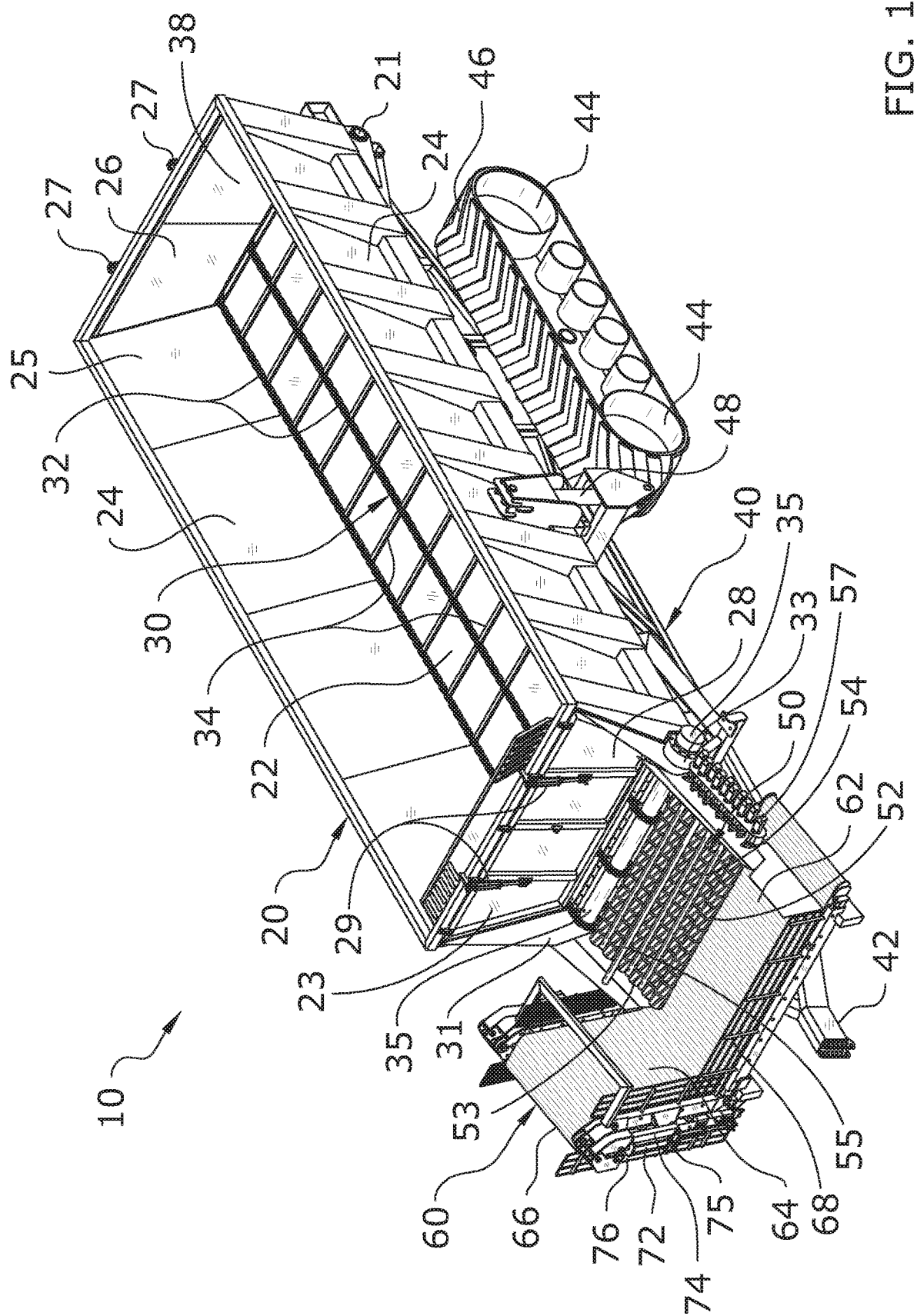
FIG. 1 is a perspective view of a crop cart cleaning and unloading system with the unloading conveyor in a retracted position in accordance with an example embodiment.

An example crop cart cleaning and unloading system 10 generally comprises a hopper 20 including an unloading end 23, a lower floor 22, and a plurality of sidewalls 24 extending upwardly from the lower floor 22, wherein the unloading end 23 is comprised of a front end or a rear end of the hopper 20, wherein the hopper 20 comprises an upper opening 38 defined by an upper end of the plurality of sidewalls 24 for receiving a crop 14 and an unloading opening within the unloading end 23 adapted for unloading the crop 14 within the hopper 20. A cleaning bed 50 is connected to the hopper 20 so as to receive the crop 14 from the hopper, wherein the cleaning bed 50 is adapted to clean debris 15 from the crop 14 such that the debris 15 falls underneath the cleaning bed 50. An unloading conveyor 60 is connected to the cleaning bed 50 for conveying the crop 14 after the debris 15 has been cleaned from the crop 14 by the cleaning bed 50.

The hopper 20, the cleaning bed 50, and the unloading conveyor 60 may be connected in series. The cleaning bed 50 may be connected to the unloading end 23 of the hopper 20. The cleaning bed 50 may comprise a plurality of rollers 53, 54 and one or more roller drives 57 such as motors for rotating the plurality of rollers 53, 54. The plurality of rollers 53, 54 may comprise spiral rollers 53 having raised ribs and/or clod rollers 54 which are smooth and do not include raised ribs.

The cleaning bed 50 is adapted to convey the crop 14 in a first direction and the unloading conveyor 60 is adapted to convey the crop 14 in a second direction, with the first direction being perpendicular to the second direction. A support frame 40 having a front end and a rear end may be provided, with the hopper 20 being pivotally connected to the support frame 40 near the front end or the rear end of the support frame 40.

A first end 51 of the cleaning bed 50 is connected underneath the unloading end 23 of the hopper 20 and a second end of the cleaning bed 50 is connected over the unloading conveyor 60. The cleaning bed 50 may be angled downwardly from the hopper 20 to the unloading conveyor 60.

Another example crop cart cleaning and unloading system 10 generally comprises a hopper 20 including an unloading end 23, a lower floor 22, and a plurality of sidewalls 24 extending upwardly from the lower floor 22, wherein the unloading end 23 is comprised of a front end or a rear end of the hopper 20, wherein the hopper 20 comprises an upper opening 38 defined by an upper end of the plurality of sidewalls 24 for receiving a crop 14 and an unloading opening 37 within the unloading end 23 adapted for unloading the crop 14 within the hopper 20. A cleaning bed 50 is connected to the hopper 20 so as to receive the crop 14 from the hopper 20, wherein the cleaning bed 50 is adapted to clean debris 15 from the crop 14, wherein the cleaning bed 50 comprises a plurality of rollers 53, 54 over which the crop 14 passes such that the debris 15 from the crop 14 falls between the plurality of rollers 53, 54 and underneath the cleaning bed 50. An unloading conveyor 60 is connected to the cleaning bed 50 for conveying the crop 14 after the debris 15 has been cleaned from the crop 14 by the cleaning bed 50, wherein a first end 51 of the cleaning bed 50 is connected underneath the unloading end 23 of the hopper 20 and a second end 52 of the cleaning bed 50 is connected over the unloading conveyor 60. The hopper 20 may comprise a floor conveyor 30 for conveying the crop 14 through the unloading opening 37 of the hopper 20.

Yet another example crop cart cleaning and unloading system 10 generally comprises a support frame 40 including a first track 46 or a first wheel 44 on a first side of the support frame 40 and a second track 46 or a second wheel 44 on a second side of the support frame 40 for movably supporting the support frame 40 upon a ground surface. A hopper 20 is pivotally connected to the support frame 40 near the front end or the rear end of the support frame 40, wherein the hopper 20 includes an unloading end 23, a lower floor 22, and a plurality of sidewalls 24 extending upwardly from the lower floor 22, wherein the unloading end 23 is comprised of a front end or a rear end of the hopper 20, wherein the hopper 20 comprises an upper opening 38 defined by an upper end of the plurality of sidewalls 24 for receiving a crop 14 and an unloading opening 37 within the unloading end 23 adapted for unloading the crop 14 within the hopper 20.

A cleaning bed 50 is connected to the hopper 20 so as to receive the crop 14 from the hopper 20, wherein the cleaning bed 50 is adapted to clean debris 15 from the crop 14, wherein the cleaning bed 50 comprises a plurality of rollers 53, 54 over which the crop 14 passes such that the debris 15 from the crop 14 falls between the plurality of rollers 53, 54 and underneath the cleaning bed 50, wherein the plurality of rollers 53, 54 are comprised of spiral rollers 53 and clod rollers 54. An unloading conveyor 60 is connected to the cleaning bed 50 for conveying the crop 14 after the debris 15 has been cleaned from the crop 14 by the cleaning bed 50, wherein a first end 51 of the cleaning bed 50 is connected underneath the unloading end 23 of the hopper 20 and a second end 52 of the cleaning bed 50 is connected over the unloading conveyor 60.

The systems and methods described herein may be designed for receiving, transporting, cleaning, and unloading various types of crops 14 including field crops 14 such as, but not limited to, sugar beets, carrots, potatoes, onions, tomatoes, cucumbers, corn silage, and the like. It should also be appreciated that various non-field crops 14 may be supported, such as, but not limited to, apples, limes, lemons, oranges, and the like.

The systems and methods described herein may be utilized to receive, transport, and unload various types of crop seed. In further exemplary embodiments, various other types of non-crop materials may be received, transported, cleaned, and unloaded using the systems and methods described herein, such as, but not limited to, rocks, mined materials, bricks, and the like.

B. Support Frame

As best shown in FIGS. 1-4, a support frame 40 may provide support for a hopper 20, with the hopper 20 being connected to the support frame 40. It should be appreciated that, in some embodiments, a support frame 40 may be omitted, with the hopper 20 instead being positioned directly on the ground surface or mounted to a vehicle.

Figure 2:
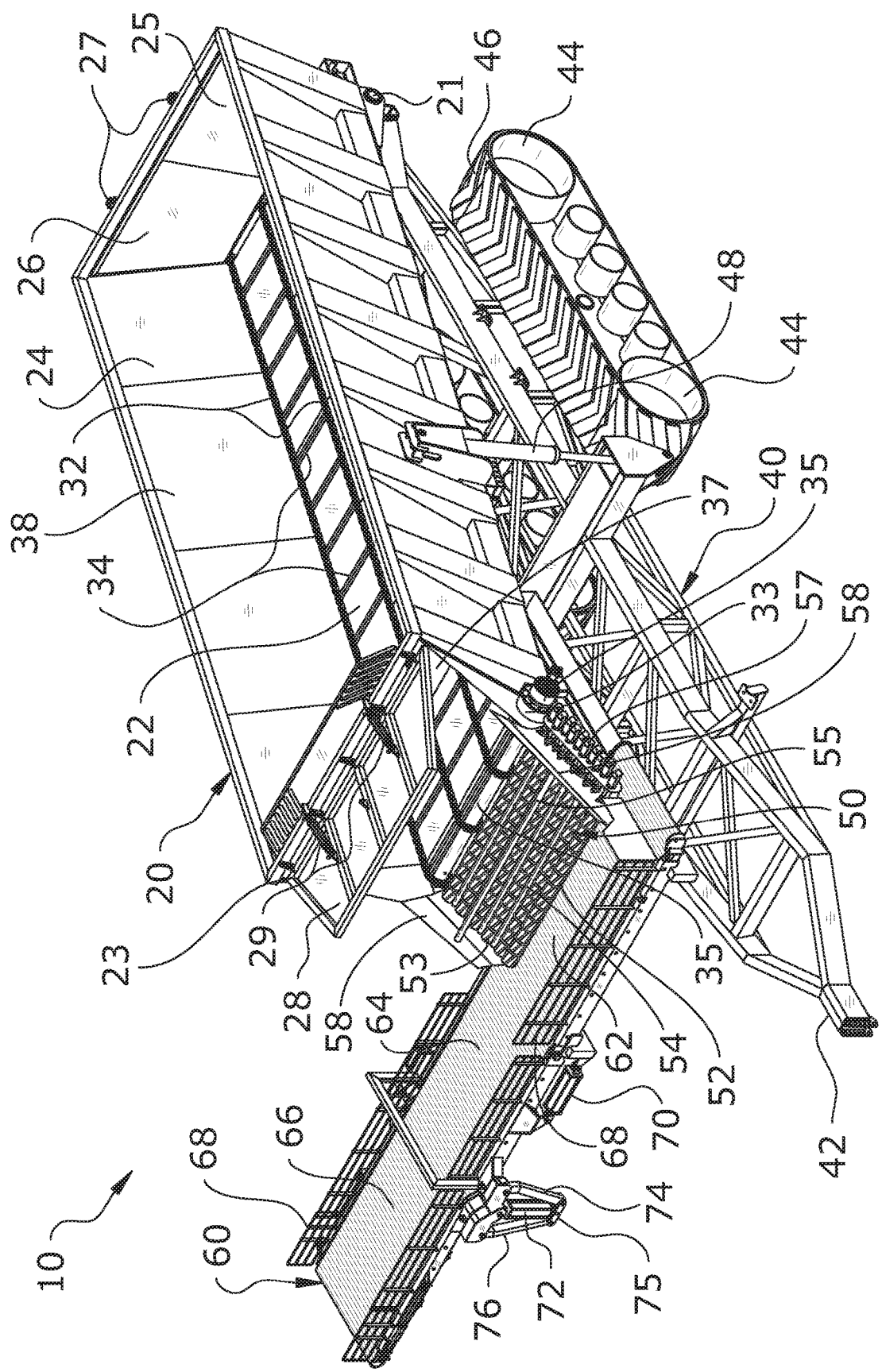
FIG. 2 is a perspective view of a crop cart cleaning and unloading system with the unloading conveyor in an extended position in accordance with an example embodiment.
Figure 4:
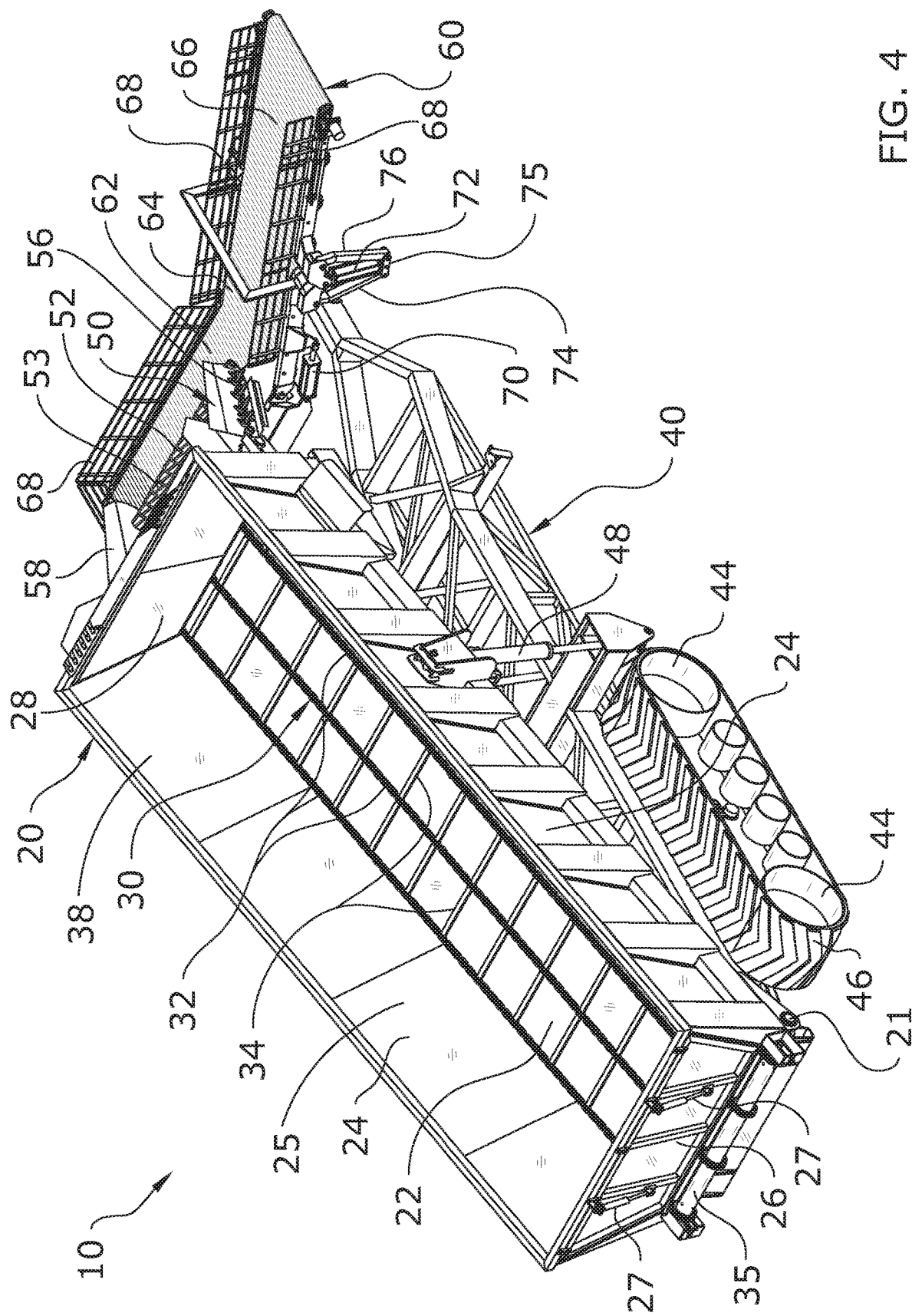
FIG. 4 is a rear perspective view of a crop cart cleaning and unloading system in accordance with an example embodiment.

As shown in FIGS. 2 and 4, the support frame 40 may comprise a front end, a rear end, a right side, and a left side. The support frame 40 includes a longitudinal axis extending from the rear end to the front end of the support frame 40. The support frame 40 may have various shapes and structures capable of supporting the hopper 20.

The support frame 40 may include a plurality of wheels 44 rotatably attached to the side of the support frame 40 for movably supporting the support frame 40 above a ground surface. A first track 46 may surround the plurality of wheels 44 on the first side of the support frame 40 and a second track 46 may surround the plurality of wheels 44 on a second side of the support frame 40 such as shown in FIGS. 3 and 4.

Figure 3:
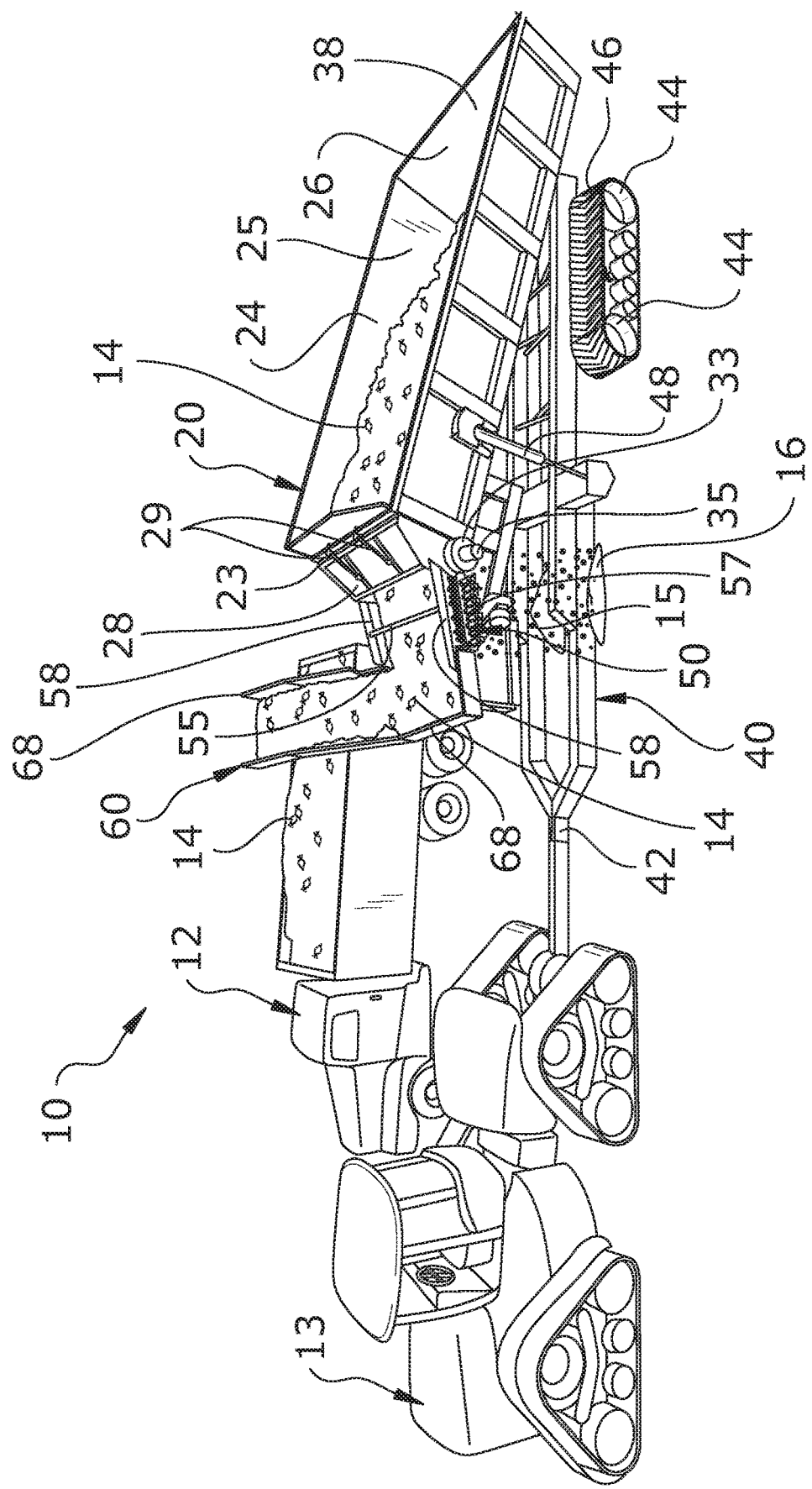
FIG. 3 is a perspective view of a crop cart cleaning and unloading system in use in accordance with an example embodiment.

The support frame 40 may include a hitch 42 adapted for removably connecting to a towing vehicle 13 such as a tractor as shown in FIG. 3. The support frame 40 may comprise any type of frame structure capable of supporting the hopper 20 in a movable manner in a wide range of locations, such as in a field, on a roadway, or a construction site.

C. Hopper

Figure 8:
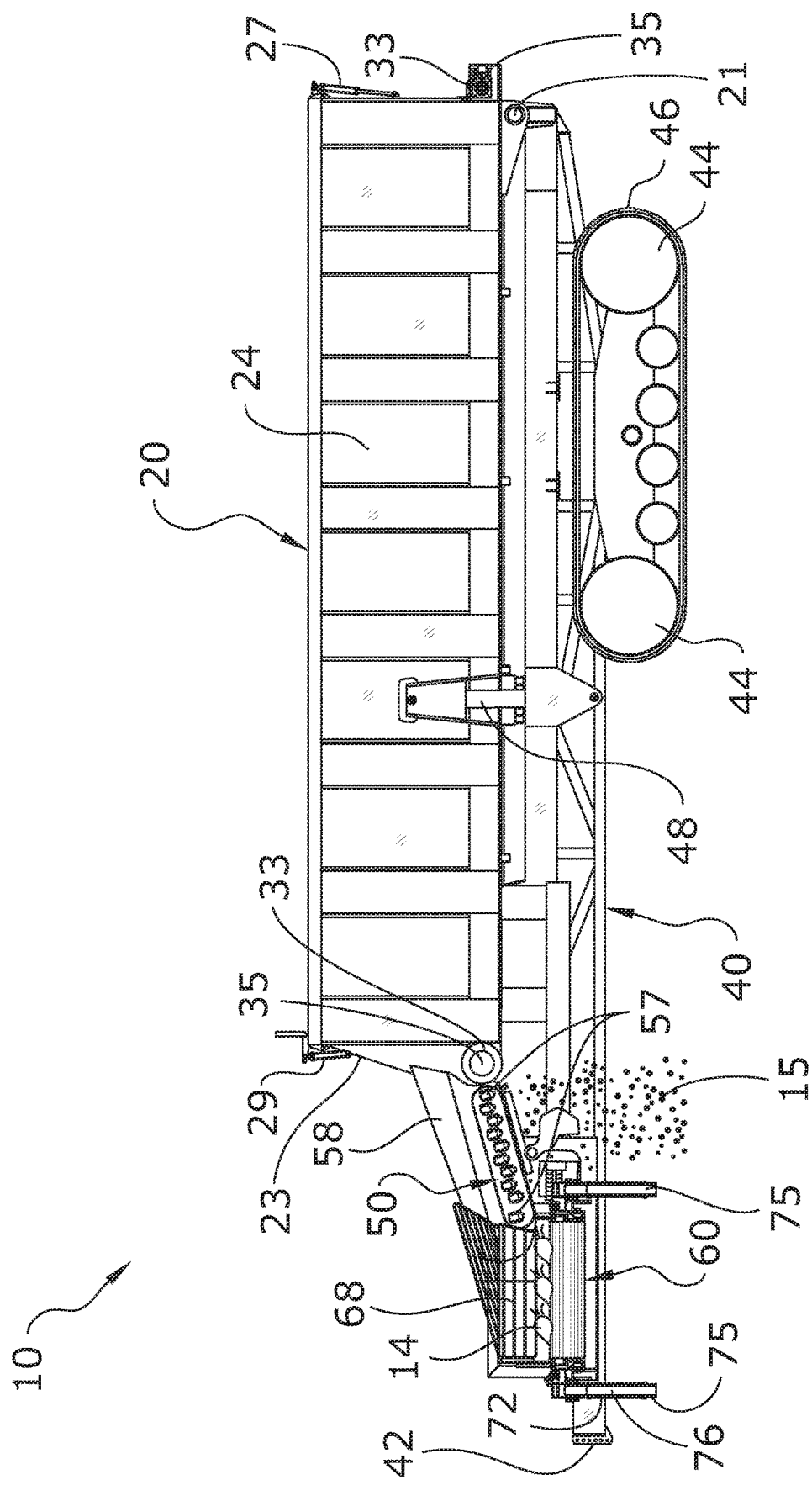
FIG. 8 is a side view of a crop cart cleaning and unloading system in use with the hopper at a horizontal orientation in accordance with an example embodiment.
Figure 9:
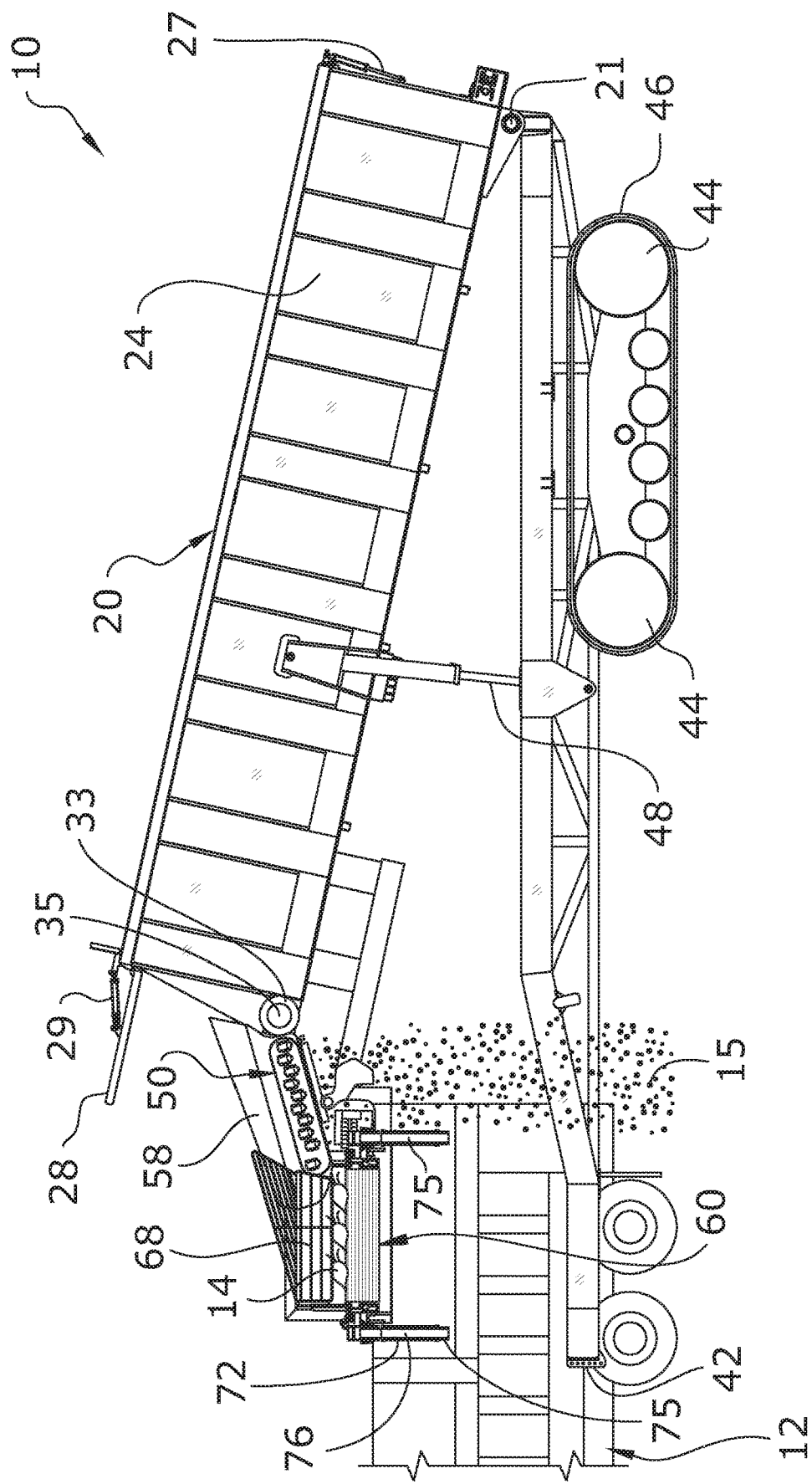
FIG. 9 is a side view of a crop cart cleaning and unloading system in use with the hopper at an angled orientation in accordance with an example embodiment.

As best shown in FIGS. 1-4, 8, and 9, a hopper 20 is utilized to receive, store, transport, and unload various types of crop 14 or other materials. The hopper 20 may form part of a crop cart including a movable support frame 40 such as shown in FIGS. 8 and 9. The hopper 20 is illustrated as comprising a lower floor 22 and a plurality of sidewalls 24 extending upwardly from the lower floor 22 so as to define an interior cavity 25 that receives the crop 14 as shown in FIGS. 1-4.

The hopper 20 may comprise an elongated rectangular-shaped structure having a longitudinal axis extending from a rear end to a front end of the hopper 20 such as shown in FIGS. 1-4. The longitudinal axis of the hopper 20 may be parallel to the longitudinal axis of a support frame 40 to which the hopper 20 may be connected.

As shown in FIGS. 1-4, an upper opening 38 is illustrated as being defined by an upper edge of the sidewalls 24 of the hopper 20. The upper opening 38 receives the crop 14 to be stored in the hopper 20. The crop 14 may be transferred through the upper opening 38 of the hopper 20 directly from a harvester (not shown) as the hopper 20 is pulled alongside the harvester in the field.

As shown in FIGS. 1 and 2, an unloading door 28 may be movably connected to an unloading end 23 of the hopper 20. The unloading end 23 of the hopper 20 may comprise the front end or the rear end of the hopper 20. In some embodiments, the unloading end 23 may comprise the first or second side of the hopper 20.

The unloading door 28 may be used for allowing selective unloading of the crop 14 in the hopper 20. The unloading door 28 may be manually opened and closed, such as by locks, clamps, straps, or the like, or may be powered such as shown in FIGS. 1 and 2. In some embodiments, the unloading door 28 may be omitted, with an exposed unloading opening 37 at the unloading end 23 of the hopper 20.

In the exemplary embodiment of FIGS. 1 and 2, it can be seen that a pair of unloading actuators 29 are connected between the sidewalls 24 of the hopper 20 and the unloading door 28 so as to adjust the unloading door 28 between a closed position shown in FIG. 1 and an opened position as shown in FIG. 2. When the unloading door 28 is in the opened position, the unloading opening 37 is exposed so that the crop 14 may pass therethrough. It should be appreciated that in alternate embodiments, more or less unloading actuators 29 may be utilized. In some embodiments, a single unloading actuator 29 may be used.

As shown in FIG. 2, the unloading door 28 may be pivotally attached at an upper end thereof to or near the upper edge of the sidewalls 24. The unloading door 28 may be positioned at the front end or the rear end of the hopper 20. As shown in FIGS. 1 and 2, the unloading door 28 may swing downwardly to open and swing upwardly to close. The inverse configuration could also be utilized, with the unloading door 28 instead swinging upwardly to open and downwardly to close.

In some exemplary embodiments, the unloading door 28 may be freely rotatable such that the unloading door 28 opens as crop 14 is transferred out of the hopper 20, with the crop 14 pushing the unloading door 28 open. In such embodiments, the unloading door 28 may be configured to automatically close, such as by force of gravity or by a biasing member, when no crops 14 are passing therethrough.

As shown in FIGS. 1 and 2, a floor conveyor 30 may be movably positioned with respect to the lower floor 22 so as to move the crop 14 in the hopper 20. The crop 14 will generally be moved toward the unloading end of the hopper 20 by the floor conveyor 30. The floor conveyor 30 may be driven by a drive motor, such as a hydraulic motor that is fluidly connected to the towing vehicle 13 pulling the hopper 20. In such an embodiment, the speed of the floor conveyor 30 may be adjustably controlled from the towing vehicle 13. The speed of the floor conveyor 30 may be increased to increase the volume and rate of the crop 14 bring discharged from the unloading end of the hopper 20, or may be decreased for the reverse effect.

The floor conveyor 30 may comprise a looped configuration in which the floor conveyor 30 is looped around a pair of rotators 35 on either end of the hopper 20 such as shown in FIGS. 2 and 4. Such a looped configuration forms an upper run of the floor conveyor 30 which traverses over the floor 22 of the hopper 20 and a lower run of the floor conveyor 30 that extends beneath the floor 22 of the hopper 20.

The floor conveyor 30 may comprise a bar-type conveyor having a plurality of cross members 34 (with or without one piece rubber or flapped attachments) attached to chains 32 that extend transverse with respect to a movement path of the floor conveyor 30 as shown in FIGS. 1-4. However, the floor conveyor 30 may be comprised of various other types of conveyors. In some embodiments, a floor conveyor 30 may be omitted entirely, with the hopper 20 instead being pivoted as discussed below such that gravity forces the crop 14 out of the unloading opening 37 rather than relying on a discrete floor conveyor 30.

As shown in FIGS. 2-4, the hopper 20 may be pivotally connected to the support frame 40 so as to allow the unloading end 23 to be lifted upwardly to an unloading position as shown in FIG. 2 and lowered downwardly to a loading position as shown in FIG. 1. The hopper 20 may be pivotally connected near the front end or the rear end of the support frame 40. In the exemplary embodiment shown in the figures, the hopper 20 is pivotally connected to the support frame 40 at or near the rear end of the support frame 40 with the unloading end 23 of the hopper 20 being located in the front as illustrated in FIGS. 1-4.

The unloading end 23 of the hopper 20 may thus be near the front end of the support frame 40 such that the floor 22 of the hopper 20 is angled downwardly toward the unloading end 23 when in the unloading position. The hopper 20 may be pivotally connected to the support frame 40 by one or more hinges 21 connected to or near the rear end of the support frame 40 and to the rear portion of the hopper 20 as shown in FIG. 4.

The floor 22 of the hopper 20 may be substantially horizontal when the hopper 20 is in the loading position as illustrated in FIG. 1. The floor 22 may be comprised of a flat and level planar structure to allow the floor conveyor 30 to move along the upper surface of the floor 22. The floor 22 of the hopper 20 is angled upwardly, preferably between 10 and 15 degrees towards the unloading end 23 when the hopper 20 is in the unloading position. When the unloading end 23 of the hopper 20 is at the front end, the floor 22 of the hopper 20 is angled upwardly, again at 10 to 15 degrees from the rear end of the hopper 20 to the front end of the hopper 20 as illustrated in FIGS. 2-4.

The hopper 20 may also include a second door opposite of the unloading door 28 as shown in FIG. 4. The figures illustrate a rear door 26 opened and closed by one or more corresponding rear actuators 27. However, if the unloading door 28 is located in the rear portion of the hopper 20, then the second door would be located at the front portion of the hopper 20. The rear door 26 may be used to unload a crop 14 or other particulate material from the hopper 20 opposite of the unloading conveyor 60 by simply lifting the front end of the hopper 20 without moving the floor conveyor 30.

One or more frame actuators 48 may be connected between the support frame 40 and the hopper 20. In the exemplary embodiment shown in the figures, a pair of frame actuators 48 is connected to opposing side portions of the support frame 40 and the hopper 20 as illustrated in FIGS. 3 and 4. However a single frame actuator 48 may be used to lift and lower the hopper 20 between the loading position and the unloading position. The frame actuators 48 may be comprised of hydraulic actuators that are fluidly connected to the hydraulic system of the towing vehicle 13, however, the frame actuators 48 may be comprised of electro-mechanical actuators or other types of actuators in different embodiments.

The frame actuators 48 are adapted to lift the unloading end 23 of the hopper 20 from a loading position into an unloading position. The loading position for the hopper 20 is for receiving the crop 14 into the hopper 20 and the unloading position for the hopper 20 is for unloading the crop 14 from the hopper 20. However, as discussed below, in some embodiments the hopper 20 may be both loaded and unloaded in the "unloading position" wherein the hopper 20 is not angularly inclined but is instead horizontally-oriented.

The unloading end 23 of the hopper 20 may be near the front end of the hopper 20, with the unloading door 28 being movably connected to the front end of the hopper 20 also to unload the field crop 14 from the front end of the hopper 20 when the front end of the hopper 20 is elevated at 10 to 15 degrees. The frame actuators 48 may be connected to a front portion of the hopper 20 to lift the front end of the hopper 20 and the unloading conveyor 60 upwardly.

D. Cleaning Bed

Figure 10:
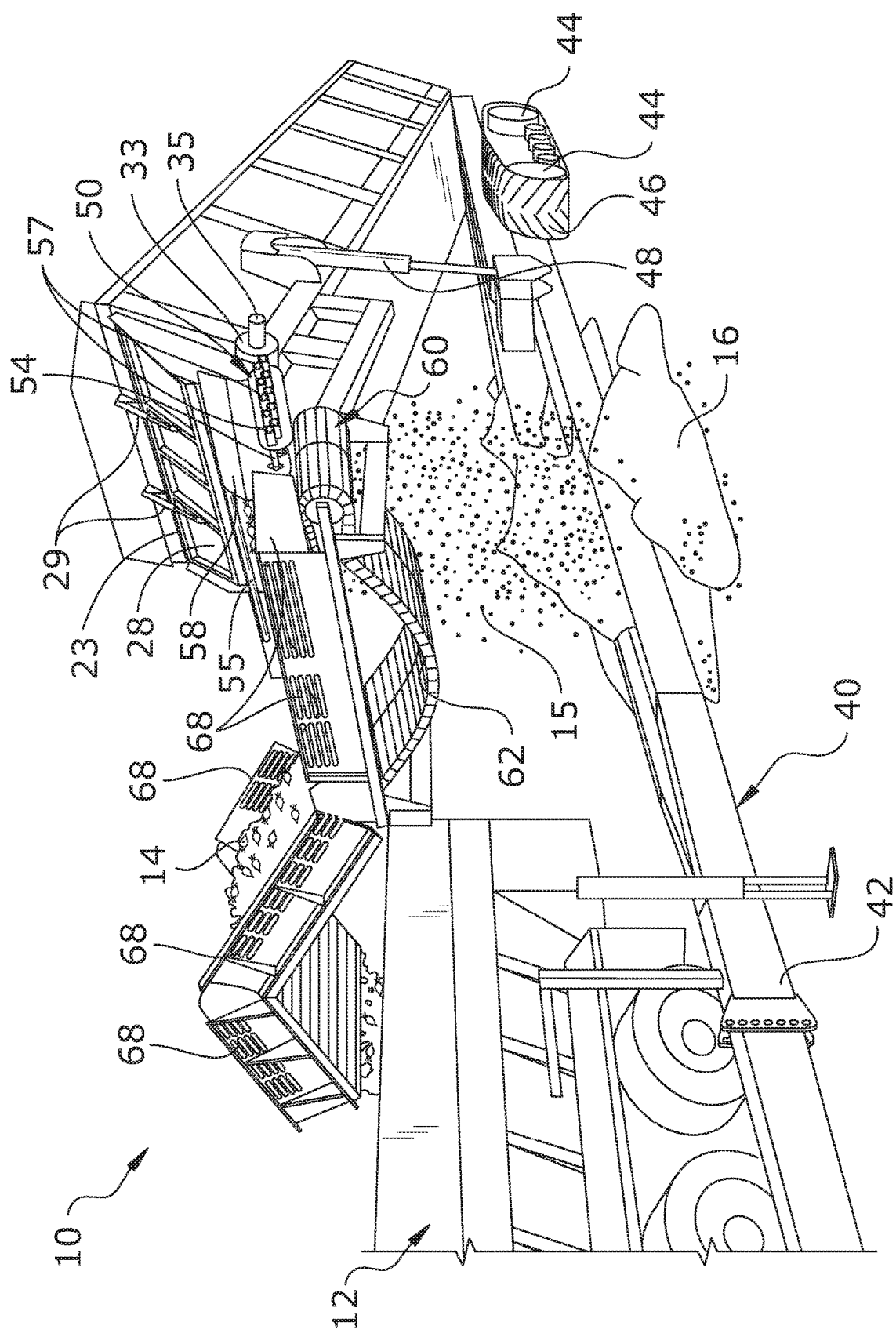
FIG. 10 is a frontal perspective view of a crop cart cleaning and unloading system in use in accordance with an example embodiment.
Figure 11:
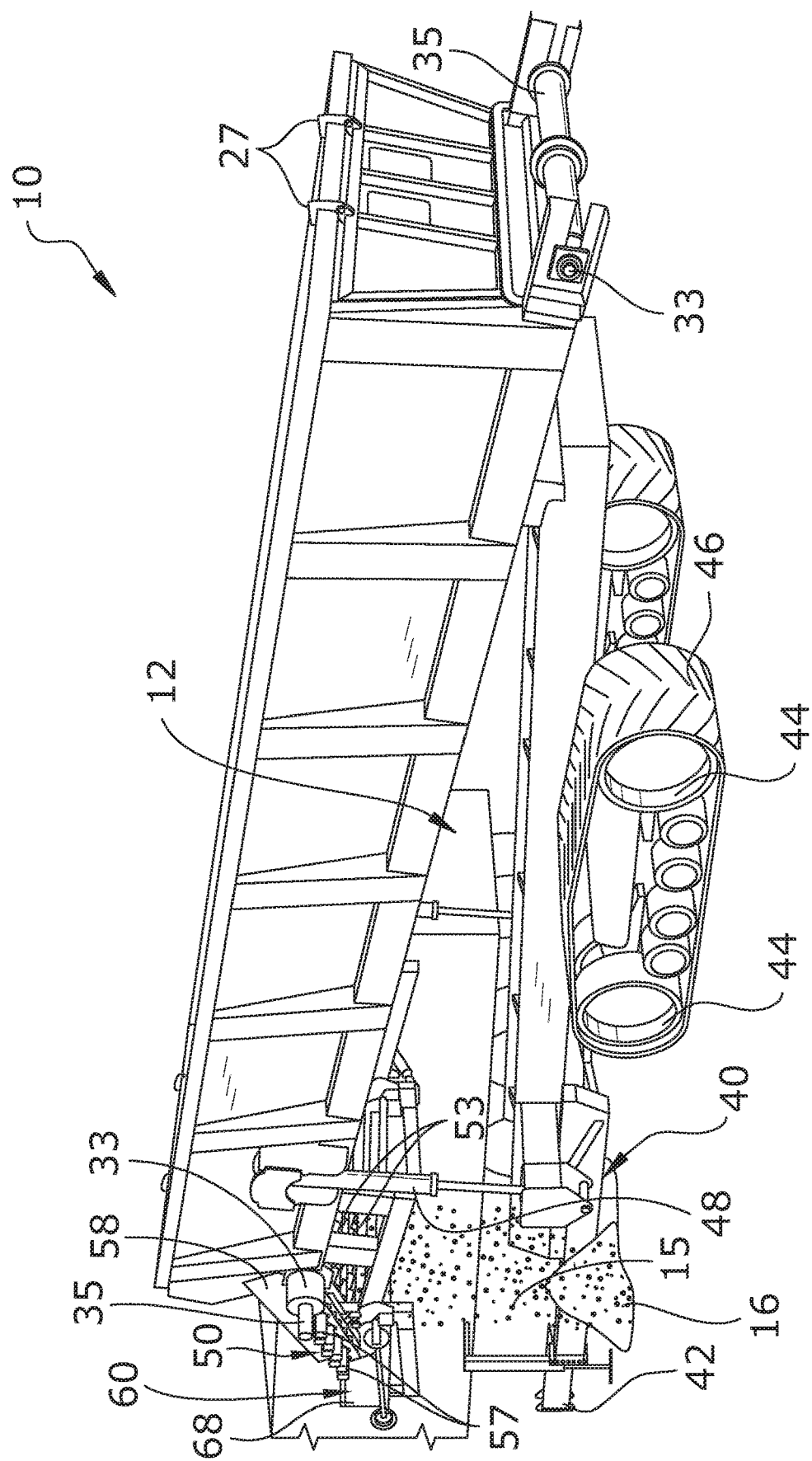
FIG. 11 is a rear perspective view of a crop cart cleaning and unloading system in use in accordance with an example embodiment.
Figure 12:
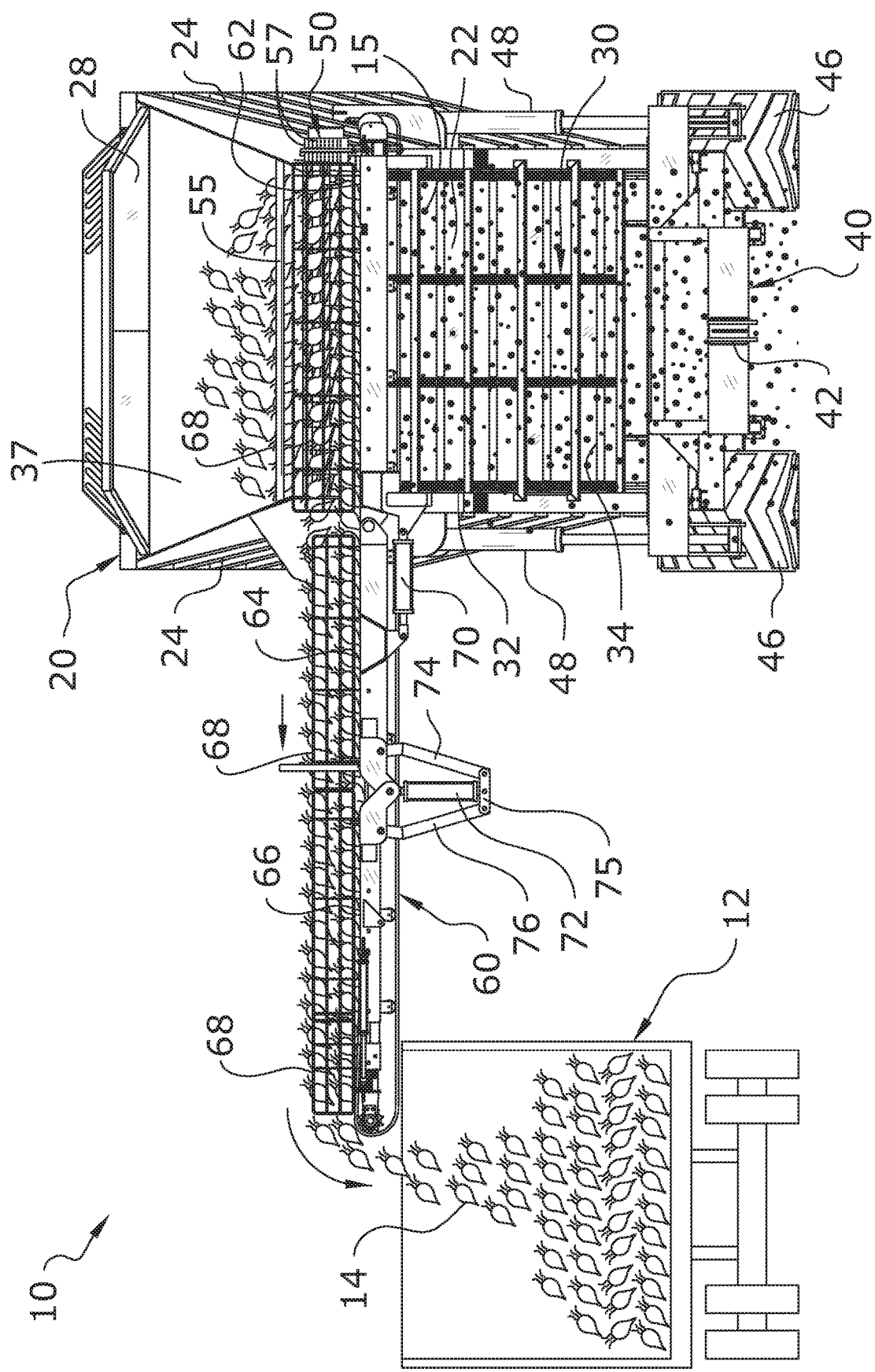
FIG. 12 is a rear view of a crop cart cleaning and unloading system in use in accordance with an example embodiment.

As shown throughout the figures, a cleaning bed 50 is connected between the hopper 20 and the unloading conveyor 60. As crop 14 is discharged from the unloading end 23 of the hopper 20, the crop 14 traverses over the cleaning bed 50 such that debris 15 is extracted by the cleaning bed 50 to clean the crop 14. The debris 15 may fall underneath the cleaning bed 50 to form a debris pile 16 such as shown in FIGS. 10 and 11.

The cleaning bed 50 serves to separate debris 15, such as clod, stones, haulm, and loose soil, from a wide range of crop 14 such as but not limited to fruit, vegetables, and aliums, including potatoes, salad potatoes, sweet potatoes, onions, shallots, carrots, parsnips, celeriac, chicory, swedes, red beets, Brussel sprouts, flower bulbs, apples, bell peppers, and the like.

The shape, size, positioning, and orientation of the cleaning bed 50 may vary in different embodiments. In the exemplary embodiment shown in the figures, the cleaning bed 50 is illustrated as comprising a substantially rectangular shape including a first end 51 which receives the crop 14 and a second end 52 which discharges the crop 14 after being cleaned of debris 15.

As shown in FIGS. 2 and 3, the first end 51 of the cleaning bed 50 may be connected to the hopper 20 and the second end 52 of the cleaning bed 50 may be connected to the unloading conveyor 60. Thus, crop 14 will be discharged from the unloading end 23 of the hopper 20, such as by the floor conveyor 30 or by force of gravity if the hopper 20 is tilted, to be received by the first end 51 of the cleaning bed 50.

The crop 14 will then traverse the cleaning bed 50 either by force of gravity or by conveyance using the rollers 53, 54 described below. As the crop 14 traverses the cleaning bed 50, debris 15 will be extracted such as by being shaken loose from the crop 14. The debris 15 will fall through the cleaning bed 50, such as between the rollers 53, 54. After traversing the cleaning bed 50, the cleaned crop 14 will be discharged from the second end 52 of the cleaning bed 50 onto the unloading conveyor 60 such as shown in FIG. 3.

As shown in FIGS. 1-3 and 8-13, the cleaning bed 50 is connected between the hopper 20 and the unloading conveyor 60. The cleaning bed 50 receives crop 14 and debris 15 from the hopper 20, cleans the debris 15 from the crop 14, and then transfers the cleaned crop 14 to the unloading conveyor 60 for conveyance to a drop-off location, such as the ground surface, a stationary container, or a transport vehicle 12.

The manner in which the cleaning bed 50 is connected between the hopper 20 and the unloading conveyor 60 may vary in different embodiments. While the figures illustrate the cleaning bed 50 being connected to the hopper 20, it should be appreciated that the cleaning bed 50 may be individually supported without being connected directly to the hopper 20 and/or unloading conveyor 60, such as by a frame. In such an embodiment, the cleaning bed 50 would be supported in an upright position between the hopper 20 and the unloading conveyor 60 such that the crop 14 is transferred from the hopper 20 onto the cleaning bed 50 and then subsequently transferred from the cleaning bed 50 onto the unloading conveyor 60.

In other embodiments, the cleaning bed 50 may be connected to the hopper 20 and/or the unloading conveyor 60, such as by welding, brackets, bolts, fasteners, straps, and the like. In some embodiments, the first end 51 of the cleaning bed 50 may be connected to the unloading end 23 of the hopper 20 and supported in a position with the second end 52 of the cleaning bed 50 being positioned over the unloading actuator 60. In other embodiments, the second end 52 of the cleaning bed 50 may be connected to the unloading conveyor 60 and supported in apposition with the first end 51 of the cleaning bed 50 being positioned underneath the unloading end 23 of the hopper 20.

In the exemplary embodiment shown in the figures, the first end 51 of the cleaning bed 50 is shown being connected to the unloading end 23 of the hopper 20. The first end 51 of the cleaning bed 50 may be level with or underneath the unloading opening 37 of the hopper 20, so long as crop 14 is easily transferred from the hopper 20 to the cleaning bed 50 by the floor conveyor 30 or force of gravity.

Continuing to reference the exemplary embodiment shown in the figures, the second end 52 of the cleaning bed 50 is shown being connected to the unloading conveyor 60. The second end 52 of the cleaning bed 50 may be level with or positioned above the unloading conveyor 60, so long as the crop 14 may be easily transferred from the cleaning bed 50 onto the unloading conveyor 60 after being cleaned of debris 15.

The orientation of the cleaning bed 50 may vary in different embodiments. In the exemplary embodiment shown in the figures, the cleaning bed 50 is shown as being downwardly angled between the hopper 20 and the unloading conveyor 60. More specifically, the first end 51 of the cleaning bed 50 is at a higher elevation than the second end 52 of the cleaning bed 50, creating a slope to aid with transferring the crop 14 from the first end 51 of the cleaning bed 50 to the second end 52 of the cleaning bed 50 to be discharged onto the unloading conveyor 60.

It should be appreciated that the angle of incline between the second end 52 of the cleaning bed 50 and the first end 51 of the cleaning bed 50 may vary in different embodiments and thus should not be construed as limited by the exemplary figures. A higher angle of incline will increase rate and volume of crop 14 traversing the cleaning bed 50. A lower angle of incline will have the reverse effect. In some embodiments, the cleaning bed 50 may be at a level incline.

Various types of cleaning beds 50 may be utilized so long as debris 15 may be effectively cleaned from a crop 14, including but not limited to roller beds, roller tables, air separators, separators, star rollers, spiral rollers, clod rollers, and the like. In some embodiments, pressurized gasses such as air may be utilized to clear the debris 15 from the crop 14 when on the cleaning bed 50. In other embodiments, pressurized fluids such as water may be utilized to clear the debris 15 from the crop 14.

In the exemplary embodiment shown in the figures, the cleaning bed 50 is shown as comprising a plurality of rollers 53, 54 which rotate toward each other to entrain the debris 15 between adjacent rollers 53, 54 to be dispensed beneath the cleaning bed 50 while permitting the crop 14 to pass over the cleaning bed 50 and onto the unloading conveyor 60. The number and spacing of the rollers 53, 54 may vary in different embodiments and should not be construed as limited by the exemplary figures. The rollers 53, 54 will generally be oriented transverse to the path of travel of the crop 14 such as shown in FIG. 2.

Figure 5:
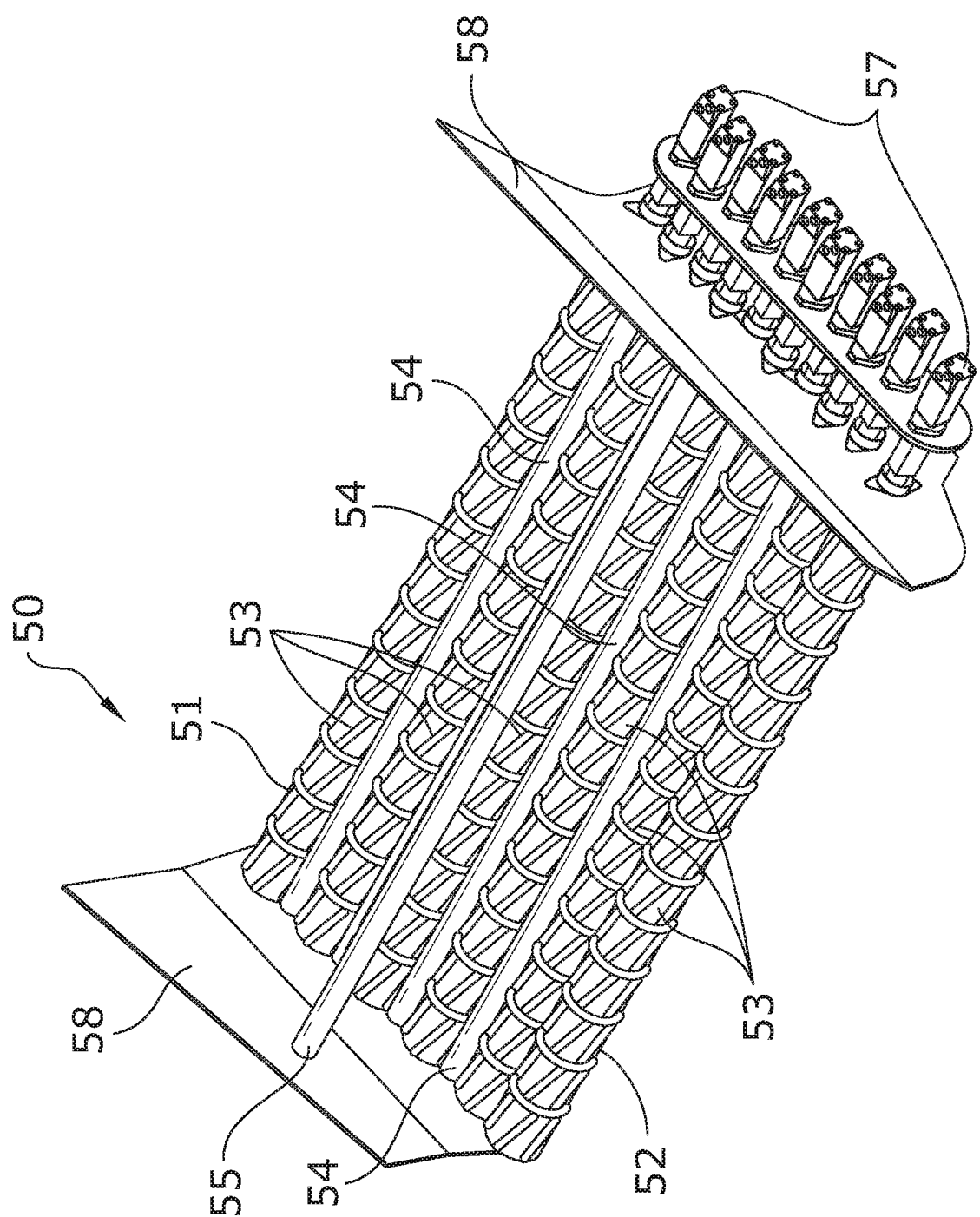
FIG. 5 is a perspective view of a cleaning bed of a crop cart cleaning and unloading system in accordance with an example embodiment.

Various types of rollers 53, 54 may be utilized in different patterns and configurations. In the exemplary figures, both spiral rollers 53 having ribs and smooth clod rollers 54 not having ribs are shown as comprising the cleaning bed 50. Each of the spiral rollers 54 may comprise a spiral rib which extends around the spiral roller 53 in a spiral configuration as shown in FIGS. 5-7. Each of the clod rollers 54 may comprise a smooth surface.

In the exemplary embodiment shown in the figures, it can be seen that the clod rollers 54 are positioned between pairs of spiral rollers 53. Each pair of rollers 53, 54, which may comprise either a pair of spiral rollers 53 or a spiral roller 53 and a clod roller 54, are contra-rotating in that they rotate toward each other so as to drive debris 15 down through spaces between adjacent rollers 53, 54. The debris 15 is then discharged underneath the cleaning bed 50 such as shown in FIGS. 8-10 and 12.

The rollers 53, 54 may be deformable so as to allow harder debris 15 such as stones to pass therebetween while retaining the larger crop 14. The rollers 53, 54 may be spring-biased to momentarily separate from each other to allow larger rocks or other debris 15 to pass therebetween.

The rollers 53, 54 will generally be rotated while the cleaning bed 50 is in use. Generally, each adjacent pair of rollers 53, 54 will be contra-rotating, with the first of the pair of rollers 53, 54 rotating in a direction and the second of the pair of rollers 53, 54 rotating in a second, opposite direction toward the first of the pair of rollers 53, 54. The manner in which the rollers 53, 54 are rotated may vary in different embodiments. In the exemplary embodiment shown in FIGS. 5-7, each roller 53, 54 is illustrated as being driven by a roller drive 57 at one end, with the other end being rotatably positioned within a roller bearing 56.

The type of roller drive 57 may vary in different embodiments. For example and without limitation, the roller drives 57 may comprise a motor such as a hydraulic or electric motor. The roller drives 57 may be controlled from within the towing vehicle 12, such as by electrical or hydraulic lines running from the towing vehicle 12 to the cleaning bed 50.

While the figures illustrate that each of the rollers 53, 54 includes its own roller drive 57, it should be appreciated that less roller drives 57 may be utilized. For example, with the use of cranks and/or gears, a single roller drive 57 could provide rotational force to all of the rollers 53, 54, with some rollers 53 being rotated in a first direction and other rollers 53, 54 being rotated in a second, opposite direction.

As shown in FIGS. 5-7, the cleaning bed 50 may include walls 58 between which the rollers 53, 54 extend. The walls 58 may be utilized to prevent the crop 14 from falling over either of the outer edges of the cleaning bed 50 when in use. Each of the walls 58 may extend from the first end 51 of the cleaning bed 50 to the second end 52 of the cleaning bed 50 such as shown in FIG. 5. The walls 58 may be inclined toward the cleaning bed 50 or may be vertically-oriented. The walls 58 of the cleaning bed 50 may overlap with the edge guards 68 of the unloading conveyor 60 such as shown in FIGS. 2 and 3 so as to prevent crop 14 from falling off the cleaning bed 50 before transferring to the unloading conveyor 60.

Similarly, the cleaning bed 50 may comprise an upper guard 55 as shown in FIGS. 2 and 5 which extends between the outer walls 58 of the cleaning bed 50 transverse to the direction of movement of the crop 14 through the cleaning bed 50. The upper guard 55 may comprise a rod or other elongated member which extends across the cleaning bed 50 at an elevated height with respect to the rollers 53, 54. If the crop 14 is stacked too high as it enters the cleaning bed 50, the guard 55 will push any crop 14 exceeding a set height limit back to smooth out any "hills" formed by clumps of crop 14 which can negatively impact the cleaning process.

E. Unloading Conveyor

The unloading conveyor 60 may be connected to the cleaning bed 50 and is adapted to receive and discharge a crop 14 received from the cleaning bed 50 after the crop 14 has been cleaned of debris 15. As shown in the figures, the unloading conveyor 60 may be connected beneath the cleaning bed 50, with the cleaning bed 50 extending partially over the unloading conveyor 60, such that cleaned crop 14 will fall off of the cleaning bed 50 and on to the unloading conveyor 60. The unloading conveyor 60 may be positioned at a lower elevation than the unloading end 23 of the hopper 20, with the cleaning bed 50 being angled downwardly between the hopper 20 and the unloading conveyor 60 as shown in FIG. 2.

The unloading conveyor 60 may be comprised of a bar-type conveyor belt having a plurality of cross bars and a plurality of slots, however, the unloading conveyor 60 may be comprised of various other types of conveyors. A drive motor moves the unloading conveyor 60 so the upper run of the unloading conveyor 60 moves the crop 14 in a first direction towards the discharge end of the unloading conveyor 60. The drive motor may be comprised of a hydraulic motor that is fluidly connected to the towing vehicle 13 pulling the hopper and with the speed of the unloading conveyor 60 adjustably controlled from the towing vehicle 13. The faster the unloading conveyor 60 moves a corresponding increase in the volume of crop 14 discharged to the unloading conveyor 60 occurs and vice versa.

The unloading conveyor 60 has an upper run that moves the crop 14 to the discharge end of the unloading conveyor 60 to discharge the field crop 14 into a different vehicle or location. The unloading conveyor 60 also has a lower run that provides a return for the unloading conveyor 60. The longitudinal axis of the unloading conveyor 60 may be substantially transverse with respect to the longitudinal axis of the lower floor 22 of the hopper 20. In the exemplary figures, the longitudinal axis of the unloading conveyor 60 is perpendicular with respect to the longitudinal axis of the lower floor 22 of the hopper 20.

The angle between the longitudinal axis of the unloading conveyor 60 and the longitudinal axis of the cleaning bed 50 may vary in different embodiments. In some embodiments, the longitudinal axis of the unloading conveyor 60 may be transverse with respect to the longitudinal axis of the cleaning bed 50. In other embodiments, the longitudinal axis of the unloading conveyor 60 may be in line (linearly-oriented) with respect to the longitudinal axis of the cleaning bed 50. In such an embodiment, the crop 14 is conveyed in the same direction by both the cleaning bed 50 and the unloading conveyor 60.

In the exemplary embodiment of the figures, it can be seen that the longitudinal axis of the unloading conveyor 60 may be substantially perpendicular with respect to the longitudinal axis of the cleaning bed 50. In some embodiments, the unloading conveyor 60 may be oriented at a slight angle away from the cleaning bed 50, such as 5-10 degrees off perpendicular. For example, the angle between the longitudinal axis of the unloading conveyor 60 and the longitudinal axis of the cleaning bed 50 may comprise a 96 degree angle, which will result in the crop 14 being conveyed slightly away from the cleaning bed 50. Such a configuration may improve efficiency in both feeding and discharging the crop 14 with the unloading conveyor 60 and prevent jamming.

The proximal end of the unloading conveyor 60 may be positioned near one of the sidewalls 24 of the hopper 20 and the distal end of the unloading conveyor 60 may extend outwardly away from an opposite sidewall 24 to discharge the crop 14 at an elevated height to a transport vehicle 12 as shown in FIG. 3.

The unloading conveyor 60 may be downwardly angled from a rear edge to a front edge of the unloading conveyor 60 when the hopper 20 is in the loading position as best illustrated in FIG. 2. The unloading conveyor 60 is substantially horizontal from the rear edge to the front edge of the unloading conveyor 60 when the hopper 20 is in the unloading position as illustrated in FIG. 2. The angle of the unloading conveyor 60 with respect to the front end of the hopper 20 corresponds to the change in angle when the hopper 20 is elevated from the loading position to the unloading position so the unloading conveyor 60 is substantially level when unloading the crop 14.

The unloading conveyor 60 is comprised of an elongated structure having a longitudinal axis extending from a proximal end to a distal end. The unloading conveyor 60 is adapted to be horizontal from the proximal end to the distal end when the hopper 20 is in the unloading position. The longitudinal axis of the unloading conveyor 60 may be substantially transverse, such as but not limited to perpendicular, with respect to a longitudinal axis of the hopper 20. An upper end of the unloading conveyor 60 is positioned at or below the upper edge of the plurality of side walls when the hopper 20 is in the loading position to reduce the chance of engagement with the crop harvester or other equipment.

The unloading conveyor 60 may be comprised of a folding conveyor as illustrated in the exemplary figures. As shown, the unloading conveyor 60 is comprised of a first segment 62 attached to the unloading end 23 of the hopper 20, a second segment 64 pivotally connected to a distal end of the first segment 62, and a third segment 66 pivotally connected to a distal end of the second segment 64 as best illustrated in FIG. 1.

The first segment 62 has a first frame, the second segment 64 has a second frame and the third segment 66 has a third frame that are independently movable with respect to one another in a pivotal manner. One or more inner actuators 70 are connected between the first segment 62 and the second segment 64 of the unloading conveyor 60 to extend and retract the second segment 64 with respect to the first segment 62 as shown in FIGS. 1 and 2. One or more outer actuators 72 are connected between the second segment 64 and the third segment 66 of the unloading conveyor 60 to extend and retract the third segment 66 with respect to the second segment 64.

One or more pivot frame structures pivotally support the pivot connection between the second segment 64 and the third segment 66. The pivot frame structures are each comprised of a first arm 74 pivotally connected to the second segment 64, a second arm 76 pivotally connected to the third segment 66, and a connecting member 75 pivotally connected between the arms 74, 76 as best illustrated in FIGS. 5c through 5e of the drawings. The outer actuators 72 are connected between the connecting member 75 and the pivot joint between the second segment 64 and the third segment 66.

As shown in FIGS. 2-4, each segment 62, 64, 66 of the unloading conveyor 60 may comprise edge guards 68 which prevent crop 14 from falling off the sides of the unloading conveyor 60 while being conveyed. The edge guards 68 may comprise sidewalls or the like which extend upwardly from the outer edges of the unloading conveyor 60 as shown in FIGS. 2-4. The edge guards 68 may be angled toward the unloading conveyor 60 or may be vertically-oriented. The edge guards 68 may be solid walls or may include openings.

F. Operation of Preferred Embodiment

Figure 13:
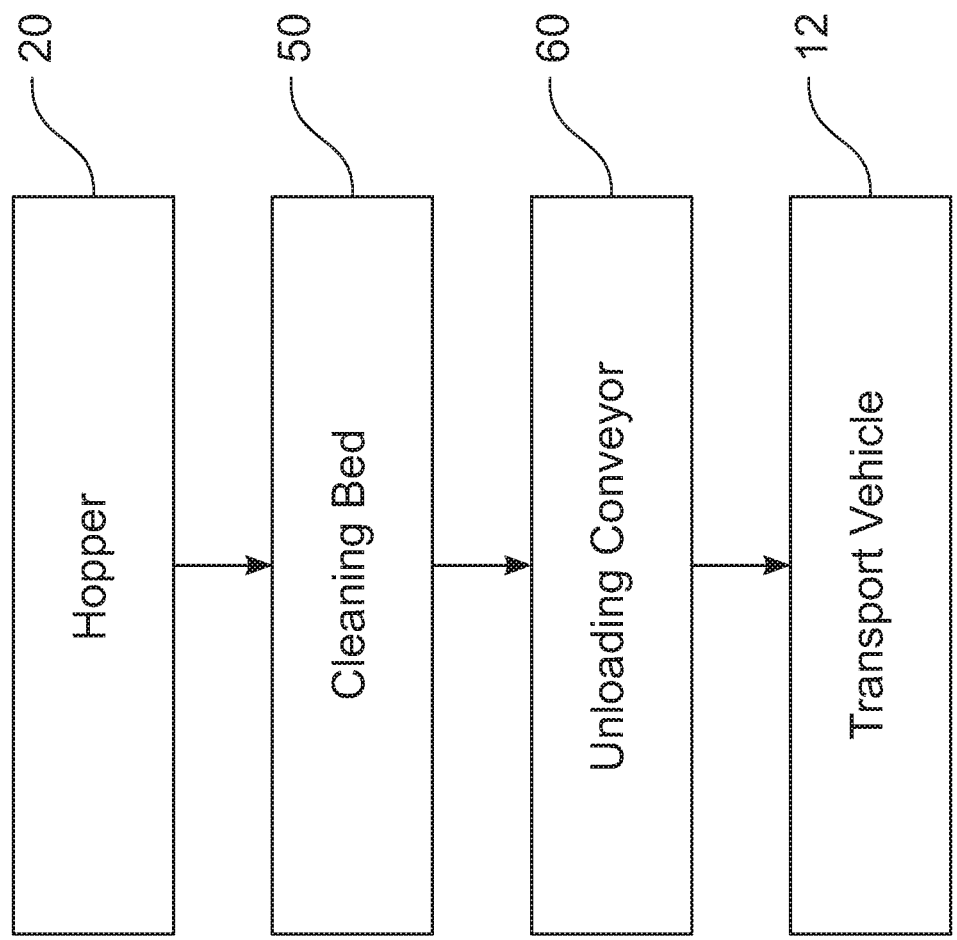
FIG. 13 is a block diagram of a crop cart cleaning and unloading system in accordance with an example embodiment.
Figure 14:
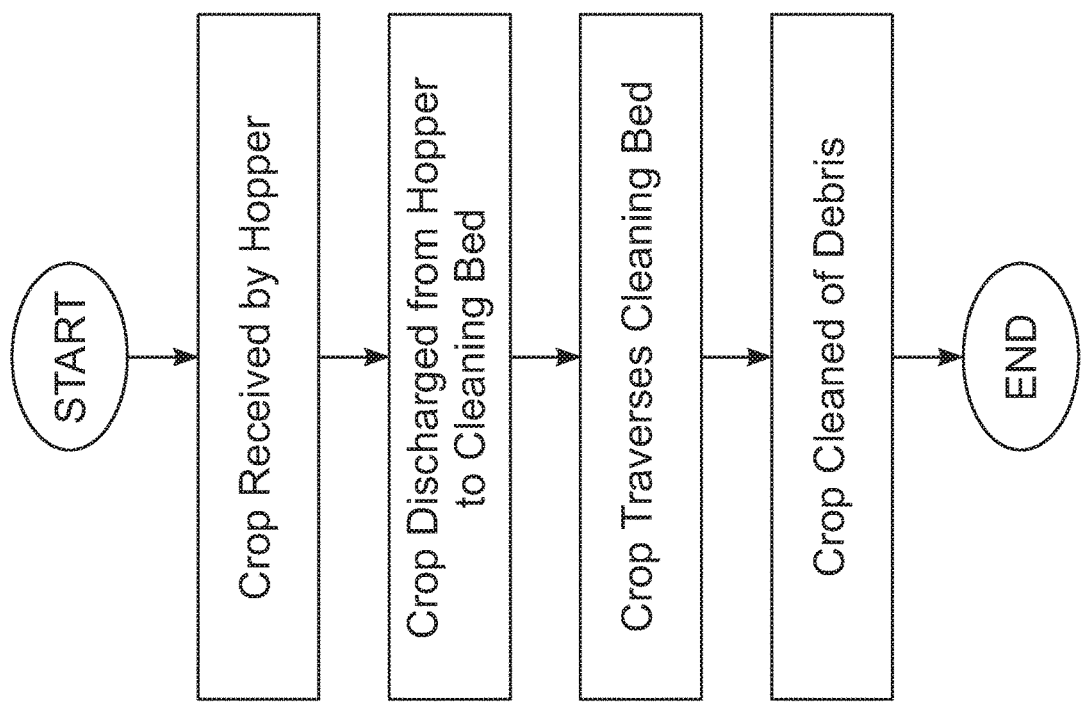
FIG. 14 is a flowchart illustrating the cleaning of debris from a crop by a crop cart cleaning and unloading system in accordance with an example embodiment.
Figure 15:
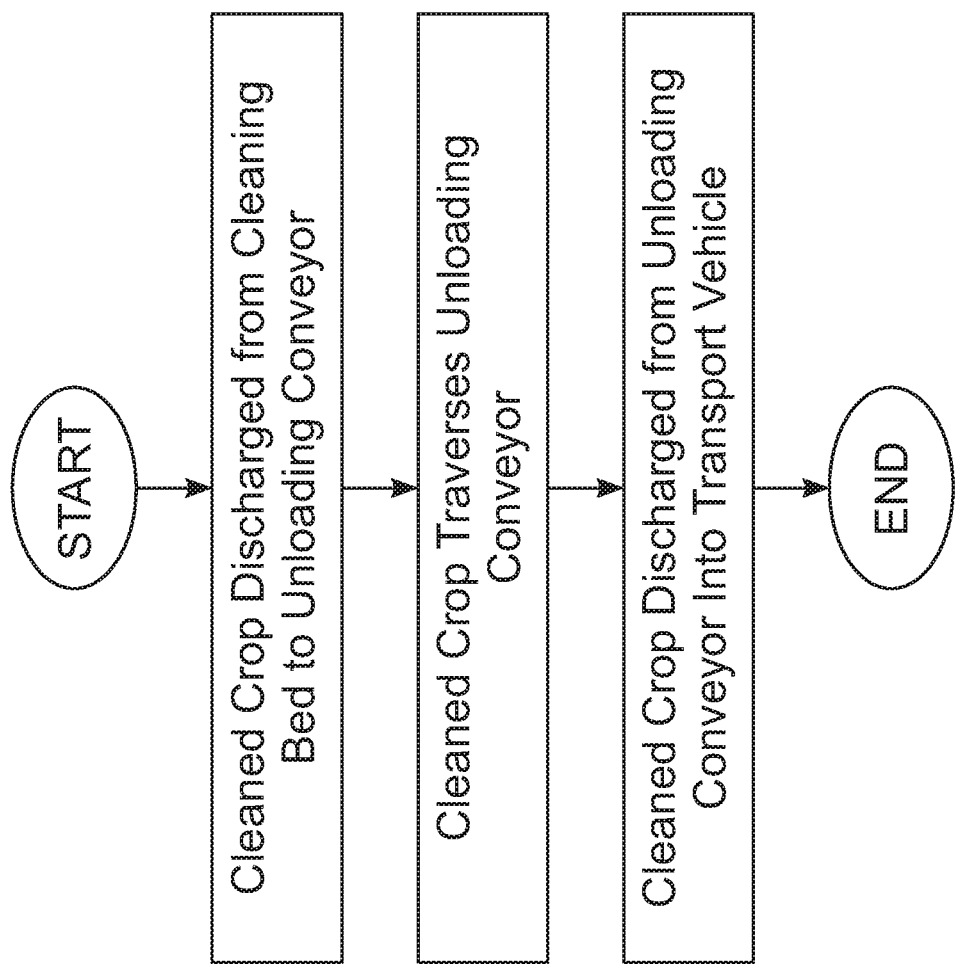
FIG. 15 is a flowchart illustrating the transfer of cleaned crop to a transport vehicle by an unloading conveyor of a crop cart cleaning and unloading system in accordance with an example embodiment.

FIG. 13 illustrates a block diagram of an exemplary embodiment of a crop cart cleaning and unloading system 10 which comprises a hopper 20, a cleaning bed 50, and an unloading conveyor 60 each being connected in a series configuration with each other. As shown in FIG. 14, the crop 14 is first received by the hopper 20, such as from a harvester in the field. The crop 14 is then transferred from the hopper 20, such as by inclining the hopper 20 or by use of a floor conveyor 30, to a cleaning bed 50. As the crop 14 traverses the cleaning bed 50, debris 15 such as rocks and soil are separated from the crop 14 and dropped underneath the cleaning bed 50 in a debris pile 16. As shown in FIG. 15, the cleaned crop 14 then exits the cleaning bed 50 onto an unloading conveyor 60, where it may be conveyed to be dropped off onto the ground surface, into a container, or into a transport vehicle 12.

In use, the hitch 42 of the support frame 40 is first connected to a towing vehicle 13 such as a tractor. The actuators 27, 29, 48, 70, 72 and roller drives 57 may be connected to the towing vehicle's 13 hydraulic system to allow operation of the various components of the system from within the towing vehicle 13. The operator may then board the towing vehicle 13 and transport the towing vehicle 13 and hopper 20 to a location to receive the crop 14.

The crop 14 may be received by the hopper 20 in a variety of manners. The hopper 20 may be moved in the field alongside a harvester (not shown), with the crop 14 being fed directly into the hopper 20 through the upper opening 38 from the harvester, such as by an auger, conveyor, or the like. In other embodiments, the hopper 20 may be stationary as it receives a load of crop 14. For example, the crop 14 could be dumped into a stationary hopper 20.

With the hopper 20 storing a volume of crop 14, the crop cart cleaning and unloading system 10 may be activated to both clean and unload the crop 14 from the hopper 20. The unloading door 28 on the unloading end 23 of the hopper 20 is opened to allow the crop 14 to be discharged through the unloading opening 37 of the hopper 20. The unloading door 28 may be opened manually, such as by lifting by an individual, or automatically, such as through use of one or more unloading actuators 29.

The manner in which the crop 14 is discharged may vary in different embodiments. In one exemplary embodiment, a floor conveyor 30 may be activated to convey the crop 14 toward the unloading end 23 of the hopper 20 and out of the unloading opening 37. In another exemplary embodiment, the end opposite to the unloading end 37 of the hopper 20 may be raised to an elevation, with the unloading end 37 remaining in place. In such a manner, the hopper 20 may be inclined toward the unloading end 37 such that the crop 14 is forced by gravity toward the unloading end 37 and out the unloading opening 37.

The manner in which the hopper 20 is inclined may vary in different embodiments. In the exemplary embodiment of the figures, one or more frame actuators 48 may be utilized to lift one end of the hopper 20 such as shown in FIG. 2. In other embodiments, the entire hopper 20 may be raised at a horizontal, level configuration by lifting both ends of the hopper 20 simultaneously. Such an embodiment may be utilized to adjust the height of the unloading opening 37 to account for the corresponding height of the transport vehicle 12 which eventually receives the crop 14 after being cleaned of debris 15.

In yet other embodiments, the hopper 20 may not be raised or inclined at all. In such embodiments, the hopper 20 may discharge the crop 14 even while at a level, horizontal orientation such as shown in FIG. 1 using the floor conveyor 30, rather than gravity, to force the crop 14 toward the unloading end 23 of the hopper 20.

With the hopper 20 conveying the crop 14 toward its unloading end 23, the cleaning bed 50 may be activated. When activated, the rollers 53, 54 of the cleaning bed 50 will be rotated or oscillated, such as by the roller drives 57. In one exemplary embodiment, each pair of adjacent rollers 53, 54 are contra-rotating such that each of the pair of rollers 53, 54 rotates toward the other of the pair of rollers 53, 54.

As the rollers 53, 54 are rotated, debris 15 from the crop 14 will be entrained in the spaces between each pair of adjacent rollers 53, 54. Dirt clods will be broken apart, and the debris 15 will be forced between the rollers 53, 54 to fall underneath the cleaning bed 50. If the hopper 20 is in movement, the debris 15 will form a line which can be gathered later. If the hopper 20 is stationary, the debris 15 may form a debris pile 16 underneath the cleaning bed 50 that can be retrieved later.

The cleaning bed 50 will generally be tilted, with its receiving first end 51 being at a higher elevation than it's discharging second end 52. In this manner, the crop 14 is conveyed from the first end 51 to the second end 52 of the cleaning bed 50 while being cleaned of debris 15 by rotating action of the rollers 53, 54. As shown in the figures, both the hopper 20 and the cleaning bed 50 may convey the crop 14 in the same direction, with the hopper 20 and cleaning bed 50 being linearly-oriented.

After being cleaned of debris 15, the cleaned crop 14 is transferred from the second end 52 of the cleaning bed 50 to the unloading conveyor 60. The figures illustrate that the unloading conveyor 60 moves in a direction which is transverse with respect to the direction of movement of both the floor conveyor 30 of the hopper 20 and the cleaning bed 50.

More specifically, as shown in FIG. 3, the direction of movement of the unloading conveyor 60 may be substantially perpendicular with respect to the direction of movement of the floor conveyor 30 and cleaning bed 50. By way of example and without limitation, the angle between the directions of movement of the unloading conveyor 60 and the cleaning bed 50 may range between 80 and 100 degrees. As a further example without imitation, the angle between the directions of movement of the unloading conveyor 60 and the cleaning bed 50 may comprise a 96 degree angle which is 6 degrees off perpendicular. In such an embodiment, the crop 14 is conveyed slightly away from the cleaning bed 50 by the unloading conveyor 60. In other embodiments, the angle may comprise a 90 degree angle (fully perpendicular).

In other embodiments, the unloading conveyor 60 may convey the crop 14 in the same direction as the hopper 20 and cleaning bed 50, or may convey the crop 14 in multiple directions. In such an embodiment in which the crop 14 is conveyed by the unloading conveyor 60 in the same direction as the hopper 20 and cleaning bed 50, the unloading conveyor 60 may be linearly-oriented in a straight line with respect to the cleaning bed 50.

The unloading conveyor 60 may be adjusted utilizing the inner and outer actuators 70, 72 to adjust the segments 62, 64, 66 of the unloading conveyor 60 to a desired orientation. The distal end of the unloading conveyor 60 may be positioned over a transport vehicle 12 such that the cleaned crop 14 falls from the unloading conveyor 60 into the transport vehicle 12. Alternatively, a transport vehicle 12 may be omitted and the unloading conveyor 60 may instead unload the cleaned crop 14 onto a ground surface or into a stationary container.

Unless otherwise defined, all technical and scientific terms used herein have the same meaning as commonly understood by one of ordinary skill in the art to which this invention belongs. Although methods and materials similar to or equivalent to those described herein can be used in the practice or testing of the crop cart cleaning and unloading system, suitable methods and materials are described above. All publications, patent applications, patents, and other references mentioned herein are incorporated by reference in their entirety to the extent allowed by applicable law and regulations. The crop cart cleaning and unloading system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A crop cart cleaning and unloading system, comprising:
a hopper including an unloading end, a lower floor, and a plurality of sidewalls extending upwardly from the lower floor, wherein the unloading end is comprised of a front end or a rear end of the hopper, wherein the hopper comprises an upper opening defined by an upper end of the plurality of sidewalls for receiving a crop and an unloading opening within the unloading end adapted for unloading the crop within the hopper;
a cleaning bed connected to the hopper so as to receive the crop from the hopper, wherein the cleaning bed is connected to the unloading end of the hopper, wherein the cleaning bed is adapted to clean debris from the crop such that the debris falls underneath the cleaning bed; and
an unloading conveyor connected to the cleaning bed for conveying the crop after the debris has been cleaned from the crop by the cleaning bed;
wherein the hopper, the cleaning bed, and the unloading conveyor are connected in series.

2. The crop cart cleaning and unloading system of claim 1, wherein the cleaning bed comprises a plurality of rollers.

3. The crop cart cleaning and unloading system of claim 2, comprising one or more motors for rotating the plurality of rollers.

4. The crop cart cleaning and unloading system of claim 2, wherein the plurality of rollers are comprised of spiral rollers.

5. The crop cart cleaning and unloading system of claim 4, wherein the plurality of rollers are comprised of clod rollers.

6. The crop cart cleaning and unloading system of claim 1, wherein the cleaning bed is adapted to convey the crop in a first direction and the unloading conveyor is adapted to convey the crop in a second direction.

7. The crop cart cleaning and unloading system of claim 6, wherein the first direction is perpendicular to the second direction.

8. The crop cart cleaning and unloading system of claim 1, comprising a support frame having a front end and a rear end, wherein the hopper is pivotally connected to the support frame near the front end or the rear end of the support frame.

9. The crop cart cleaning and unloading system of claim 1, wherein a first end of the cleaning bed is connected underneath the unloading end of the hopper and a second end of the cleaning bed is connected over the unloading conveyor.

10. The crop cart cleaning and unloading system of claim 9, wherein the cleaning bed is angled downwardly from the hopper to the unloading conveyor.

11. A crop cart cleaning and unloading system, comprising:
a hopper including an unloading end, a lower floor, and a plurality of sidewalls extending upwardly from the lower floor, wherein the unloading end is comprised of a front end or a rear end of the hopper, wherein the hopper comprises an upper opening defined by an upper end of the plurality of sidewalls for receiving a crop and an unloading opening within the unloading end adapted for unloading the crop within the hopper;
a cleaning bed connected to the hopper so as to receive the crop from the hopper, wherein the cleaning bed is connected to the unloading end of the hopper, wherein the cleaning bed is adapted to clean debris from the crop, wherein the cleaning bed comprises a plurality of rollers over which the crop passes such that the debris from the crop falls between the plurality of rollers and underneath the cleaning bed; and
an unloading conveyor connected to the cleaning bed for conveying the crop after the debris has been cleaned from the crop by the cleaning bed, wherein a first end of the cleaning bed is connected underneath the unloading end of the hopper and a second end of the cleaning bed is connected over the unloading conveyor;
wherein the hopper, the cleaning bed, and the unloading conveyor are connected in series.

12. The crop cart cleaning and unloading system of claim 11, wherein the plurality of rollers is comprised of spiral rollers and clod rollers.

13. The crop cart cleaning and unloading system of claim 11, wherein the hopper comprises a floor conveyor for conveying the crop through the unloading opening of the hopper.

14. The crop cart cleaning and unloading system of claim 13, wherein the cleaning bed and the floor conveyor are each adapted to convey the crop in a first direction, wherein the unloading conveyor is adapted to convey the crop in a second direction.

15. The crop cart cleaning and unloading system of claim 14, wherein the first direction is perpendicular to the second direction.

16. The crop cart cleaning and unloading system of claim 11, comprising one or more motors for rotating the plurality of rollers.

17. A crop cart cleaning and unloading system, comprising:
a support frame including a first track or a first wheel on a first side of the support frame and a second track or a second wheel on a second side of the support frame for movably supporting the support frame upon a ground surface;
a hopper pivotally connected to the support frame near the front end or the rear end of the support frame, wherein the hopper includes an unloading end, a lower floor, and a plurality of sidewalls extending upwardly from the lower floor, wherein the unloading end is comprised of a front end or a rear end of the hopper, wherein the hopper comprises an upper opening defined by an upper end of the plurality of sidewalls for receiving a crop and an unloading opening within the unloading end adapted for unloading the crop within the hopper;
a cleaning bed connected to the hopper so as to receive the crop from the hopper, wherein the cleaning bed is connected to the unloading end of the hopper, wherein the cleaning bed is adapted to clean debris from the crop, wherein the cleaning bed comprises a plurality of rollers over which the crop passes such that the debris from the crop falls between the plurality of rollers and underneath the cleaning bed, wherein the plurality of rollers are comprised of spiral rollers and clod rollers; and an unloading conveyor connected to the cleaning bed for conveying the crop after the debris has been cleaned from the crop by the cleaning bed, wherein a first end of the cleaning bed is connected underneath the unloading end of the hopper and a second end of the cleaning bed is connected over the unloading conveyor;

wherein the hopper, the cleaning bed, and the unloading conveyor are connected in series.

* * * * *